(12) United States Patent
Shimizu et al.

(10) Patent No.: US 12,449,787 B2
(45) Date of Patent: Oct. 21, 2025

(54) SCADA WEB HMI SYSTEM

(71) Applicant: TOSHIBA MITSUBISHI-ELECTRIC INDUSTRIAL SYSTEMS CORPORATION, Tokyo (JP)

(72) Inventors: Ryo Shimizu, Tokyo (JP); Akira Nojima, Tokyo (JP); Nobuo Shimizu, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 519 days.

(21) Appl. No.: 18/006,727

(22) PCT Filed: Jul. 7, 2021

(86) PCT No.: PCT/JP2021/025634
§ 371 (c)(1),
(2) Date: Jan. 25, 2023

(87) PCT Pub. No.: WO2023/281662
PCT Pub. Date: Jan. 12, 2023

(65) Prior Publication Data
US 2023/0251624 A1 Aug. 10, 2023

(51) Int. Cl.
*G06F 3/048* (2013.01)
*G05B 19/4097* (2006.01)
(Continued)

(52) U.S. Cl.
CPC ....... *G05B 19/4097* (2013.01); *G06F 3/0486* (2013.01); *G06T 11/206* (2013.01);
(Continued)

(58) Field of Classification Search
CPC ...... G05B 19/4097; G05B 2219/35012; G05B 2219/32404; G05B 19/418; G05B 23/02;
(Continued)

(56) References Cited

U.S. PATENT DOCUMENTS

2001/0021880 A1* 9/2001 Kato ................. G05B 19/4103
700/160
2006/0095855 A1 5/2006 Britt et al.
(Continued)

FOREIGN PATENT DOCUMENTS

CN 107430400 A * 12/2017 ........... G05B 19/042
CN 107548475 A * 1/2018 .............. F22B 35/18
(Continued)

OTHER PUBLICATIONS

Office Action issued on Feb. 5, 2025, in corresponding Indonesian patent Application No. P00202301005, 6 pages.
(Continued)

*Primary Examiner* — Rashawn N Tillery
(74) *Attorney, Agent, or Firm* — XSENSUS LLP

(57) ABSTRACT

A drawing creating device generates HMI configuration data for a system monitoring screen from a network configuration diagram drawn by drag-and-drop operation. An HMI server device executes a system monitoring process by applying HMI configuration data to a predetermined server runtime library, and transmits a display signal according to the communication status of a monitored device. An HMI client device draws the system monitoring screen on a web browser and changes the display statuses of the parts positioned on the system monitoring screen according to the received display signal. According to the present invention, the system monitoring function of an industrial plant can be implemented in a non-programmable graphical manner.

19 Claims, 15 Drawing Sheets

(51) Int. Cl.
*G06F 3/0486* (2013.01)
*G06T 11/20* (2006.01)
*G06T 11/60* (2006.01)

(52) U.S. Cl.
CPC .... *G06T 11/60* (2013.01); *G05B 2219/35012* (2013.01); *G06T 2200/24* (2013.01)

(58) Field of Classification Search
CPC .. G06F 3/0486; G06F 3/04845; G06T 11/206; G06T 11/60; G06T 2200/24
See application file for complete search history.

(56) References Cited

U.S. PATENT DOCUMENTS

| | | | | |
|---|---|---|---|---|
| 2015/0066192 | A1* | 3/2015 | Kudou | B23H 7/06 |
| | | | | 700/162 |
| 2015/0105893 | A1* | 4/2015 | Tran | G05B 19/409 |
| | | | | 700/108 |
| 2015/0177719 | A1* | 6/2015 | Wang | G06F 21/604 |
| | | | | 700/83 |
| 2017/0277156 | A1* | 9/2017 | Deguchi | G05B 19/0426 |
| 2017/0300037 | A1* | 10/2017 | Platts | G05B 19/4097 |
| 2020/0081425 | A1* | 3/2020 | Kane | G05B 23/0208 |
| 2020/0159202 | A1* | 5/2020 | Fujieda | G05B 19/4183 |
| 2020/0290169 | A1* | 9/2020 | Ozeki | B25J 9/1633 |
| 2021/0286348 | A1* | 9/2021 | Jalluri | G05B 19/4063 |
| 2021/0373546 | A1* | 12/2021 | Fujieda | G05B 23/0272 |
| 2023/0280724 | A1* | 9/2023 | Shimizu | G05B 19/4185 |
| | | | | 700/9 |
| 2024/0419155 | A1* | 12/2024 | Yoon | G05B 19/4186 |

FOREIGN PATENT DOCUMENTS

| | | | | | |
|---|---|---|---|---|---|
| CN | 111801631 | A | | 10/2020 | |
| JP | 2006-277734 | A | | 10/2006 | |
| JP | 2012-113665 | A | | 6/2012 | |
| JP | 2014-115742 | A | | 6/2014 | |
| JP | 2017-27211 | A | | 2/2017 | |
| KR | 20200076227 | A | * | 6/2020 | ............. H04L 12/12 |
| WO | WO-2016199206 | A1 | * | 12/2016 | ............. G05B 23/02 |
| WO | WO-2020090033 | A1 | * | 5/2020 | ........... G05B 19/058 |
| WO | 2021/015024 | A1 | | 1/2021 | |
| WO | 2021/106082 | A1 | | 6/2021 | |

OTHER PUBLICATIONS

Office Action issued on May 2, 2024, in corresponding Indian patent Application No. 202317004512, 7 pages.

International Search Report and Written Opinion mailed on Sep. 14, 2021, received for PCT Application PCT/JP2021/025634, filed on Jul. 7, 2021, 11 pages including English Translation.

Office Action issued on Nov. 7, 2024, in corresponding Chinese patent Application No. 202180058678.3, 19 pages.

Office Action issued on Mar. 27, 2025, in corresponding Chinese patent Application No. 202180058678.3, 24 pages.

English Translation of International Preliminary Report on Patentability (Chapter I) mailed on Jan. 18, 2024, in corresponding PCT/JP2021/025634, 5 pages.

Office Action issued on Nov. 19, 2024, in corresponding Indian patent Application No. 202317004512, 3 pages.

Office Action issued on Dec. 5, 2023, in corresponding Japanese patent Application No. 2023-504044, 4 pages.

Office Action issued on Jun. 17, 2025, in corresponding Chinese patent Application No. 202180058678.3, 22 pages.

* cited by examiner

Connection    ← 52

| PartHMID | LANIP | ServerName |
|---|---|---|
| SYS1_1HMISVR | 192.168.0.11 | SVR1 |
| SYS1_2HMICLT | 192.168.0.12 | CLT1 |
| SYS1_3HUB8 | 192.168.0.13 | |
| SYS1_4PC | 192.168.0.14 | |

TerminalTable    ← 53

| Terminal | DeviceEnd | ConnectivityEnd |
|---|---|---|
| SYS1_1HMISVR_T1 | SYS1_1HMISVR | SYS1_1CN_1 |
| SYS1_1HMISVR_T2 | SYS1_1HMISVR | |
| SYS1_2HMICLT_T1 | SYS1_2HMICLT | SYS1_2CN_1 |
| SYS1_2HMICLT_T2 | SYS1_2HMICLT | |
| SYS1_3HUB8_T1 | SYS1_3HUB8 | SYS1_3CN_1 |
| SYS1_3HUB8_T2 | SYS1_3HUB8 | SYS1_3CN_2 |
| SYS1_4PC_T1 | SYS1_4PC | SYS1_4CN_1 |
| SYS1_4PC_T2 | SYS1_4PC | |
| SYS1_5LAN_T1 | SYS1_5LAN | SYS1_1CN_1 |
| SYS1_5LAN_T2 | SYS1_5LAN | SYS1_3CN_1 |
| SYS1_6LAN_T1 | SYS1_6LAN | SYS1_2CN_1 |
| SYS1_6LAN_T2 | SYS1_6LAN | SYS1_3CN_1 |
| SYS1_7LAN_T1 | SYS1_7LAN | SYS1_3CN_2 |
| SYS1_7LAN_T2 | SYS1_7LAN | SYS1_4CN_1 |

WorkItem    ← 54

| PartHMID | ItemSourceName | Message |
|---|---|---|
| SYS1_1HMISVR | SYS1_1SVR_SL | SERVER ANOMALY 1 |
| SYS1_1HMISVR | SYS1_1SVR_AV | SERVER ANOMALY 2 |
| SYS1_1HMISVR | SYS1_1SVR_PV | SERVER ANOMALY 3 |
| SYS1_2HMICLT | SYS1_2HMICLT_SL | CLIENT ANOMALY 1 |
| SYS1_2HMICLT | SYS1_2CLT1_SL | CLIENT ANOMALY2 |
| SYS1_3HUB8 | SYS1_3HUB_SL | HUB ANOMALY |
| SYS1_4PC | SYS1_4PC_SL | PC ANOMALY |
| SYS1_5LAN | SYS1_5LAN_SL | LAN ANOMALY 1 |
| SYS1_6LAN | SYS1_6LAN_SL | LAN ANOMALY 2 |
| SYS1_7LAN | SYS1_7LAN_SL | LAN ANOMALY 3 |

*FIG. 3*

| PART TYPE | EXPLANATION | MONITORING SCHEME | DISPLAY SCHEME | CONSTRAINT CONDITION |
|---|---|---|---|---|
| SVR_2M | SERVER WITH TWO MONITORS | MONITOR PLCS AND CLIENTS WITH PEER SERVER | CHANGE COLOR ACCORDING TO OPERATION STATUSES OF SERVER AND LOCAL MONITOR (GREEN/RED) | |
| CLT_2M | THIN CLIENT WITH TWO MONITORS | MONITOR BY CLIENT MONITORING FUNCTION OF HMI SYSTEM | CHANGE COLOR ACCORDING TO OPERATION STATUS OF THIN CLIENT (GREEN/RED) | |
| PLC | PLC | MONITOR BY MONITORING FUNCTION OF HMI SYSTEM | | |
| ODG | ONLINE DATA COLLECTING SERVER | MONITOR BY ODG MONITORING FUNCTION OF HMI SYSTEM | CHANGE COLOR ACCORDING TO OPERATION STATUS (GREEN/RED). IF COLLECTION IS BEING HALTED, FLICKER-DISPLAY INDICATOR IN YELLOW | |
| HUB_M | MANAGED HUB | MONITOR BY ICMP PACKET TRANSMISSION TO IP OF HUB | CHANGE COLOR ACCORDING TO OPERATION STATUS (GREEN/RED) | |
| HUB_U | UNMANAGED HUB | MONITOR STATUS BY OBTAINING TOKEN | CHANGE COLOR ACCORDING TO OPERATION STATUS (GREEN/RED) | |
| ECABLE | ETHERNET CABLE | MONITOR STATUS BY OBTAINING TOKEN | CHANGE COLOR ACCORDING TO OPERATION STATUS (GREEN/RED) | |
| TOKEN_RING | TOKEN-RING NETWORK | MONITOR STATUS BY OBTAINING TOKEN | CHANGE COLOR ACCORDING TO OPERATION STATUS (GREEN/RED) | |
| TCABLE | TOKEN-RING CONNECTION CABLE | MONITOR STATUS BY OBTAINING TOKEN | CHANGE COLOR ACCORDING TO OPERATION STATUS (GREEN/RED) | |
| DEV-A | EQUIPMENT A | MONITOR BY ICMP PACKET TRANSMISSION | CHANGE COLOR ACCORDING TO OPERATION STATUS (GREEN/RED) | PACKET TRANSMISSION INTERVAL IS 100 MS OR MORE |
| DEV-B | EQUIPMENT B | MONITOR BASED ON SNMP PROTOCOL | CHANGE COLOR ACCORDING TO OPERATION STATUS (GREEN/RED) | |
| DEV-C | EQUIPMENT C | MONITOR STATUS BY OBTAINING TOKEN | CHANGE COLOR ACCORDING TO OPERATION STATUS (GREEN/RED) | |
| DEV-D | EQUIPMENT D | MONITOR STATUS BY OBTAINING TOKEN | CHANGE COLOR ACCORDING TO OPERATION STATUS (GREEN/RED) | |

FIG. 15

SCADA WEB HMI SYSTEM

CROSS-REFERENCE TO RELATED APPLICATION

The present application is based on PCT filing PCT/JP2021/025634, filed Jul. 7, 2021, the entire contents of which are incorporated herein by reference.

FIELD

The present invention relates to a SCADA web HMI system, and particularly to technology for developing system monitoring functions of industrial plants in a non-programmable graphical manner.

BACKGROUND

Supervisory control and data acquisition (SCADA) is known as a system for monitoring and controlling large industrial plants. Large industrial plants include steel mills, paper mills, food factories, pharmaceutical factories, cement factories, and power plants. SCADA is a type of industrial supervisory control system that performs computer-based system monitoring, process control, and data collection.

Typical SCADA consists of the following subsystems.
(1) Human Machine Interface (HMI)
An HMI is a mechanism that presents data on a target process to the operator and allows the operator to monitor and control the process.
(2) Supervisory Control System
A supervisory control system consists of a programmable logic controller (PLC), for example. The supervisory control system collects signal data on the process and sends a control command to the process.
(3) Remote Input/Output Device (Remote Input Output: RIO)
The remote input/output device is connected to sensors installed in the process, converts the sensor signals into digital data, and sends the digital data to the supervisory control system.
(4) Communication Infrastructure
The communication infrastructure connects the supervisory control system to the remote input/output device.

As an example of a SCADA HMI subsystem, PTL 1 discloses a system with an HMI client device and an HMI server device. The HMI server device receives signal data from the PLC and transmits the signal data to the HMI client device. The signal data is signals related to a field equipment group constituting an industrial plant and includes actuator control signals and sensor detection signals.

Note that the applicant recognizes the following literatures as well as the aforementioned literature, in relation to the present invention.

CITATION LIST

Patent Literature

[PTL 1] JP 2017-27211 A
[PTL 2] JP 2012-113665 A

SUMMARY

Technical Problem

The following will explain problems in the development of the SCADA HMI subsystem, one of the aforementioned subsystems.

SCADA for monitoring and controlling industrial plants is developed according to orders from system operators. SCADA manufacturers design HMI screen images based on the specifications required by the customers, check with the client to see if there are any discrepancies with the required specifications, and adjust the HMI screen images. The design of the HMI screens uses a general-purpose drawing editor with an advanced screen editing function. The general-purpose drawing editor is, for example, Microsoft Visio (registered trademark).

Traditionally, SCADA manufacturers would use, after obtaining the client's agreement, engineering tools beside the drawing editor to develop an HMI subsystem. At this time, the electronic data created by the drawing editor is not used, and the HMI developer creates new screen data manually using an engineering tool based on the HMI screen image that the client has agreed upon. In addition, the HMI developer must also create a motion program for each of the parts positioned on the HMI screen, using an engineering tool in order to exercise the monitoring and control function of the HMI screen. HMI development using engineering tools is very costly, which brought a need to improve the efficiency of HMI development.

One of the HMI screens of an industrial plant system is a system monitoring screen for monitoring the operating status of each device connected via a computer network. As mentioned above, the HMI developer needs to create new screen data for the system monitoring screen using an engineering tool based on the HMI screen image that the client has agreed upon, and create a program that makes the system monitoring screen function.

In creating system monitoring screens, network monitoring software that can draw network configuration diagrams, such as those used in office IT systems, may be incorporated into the SCADA HMI subsystem; however, this is not efficient for the following two reasons.

First, the SCADA HMI subsystem has a number of HMI screens for monitoring and controlling industrial plants, and the system monitoring screen is only one of them. The design of all HMI screens needs to be unified. The aforementioned network monitoring software can only draw network configuration diagrams which cannot be used as system monitoring screens with the same design as those of the other HMI screens.

Second, industrial plant systems consist of equipment that has a longer life than that of office IT systems. In office IT systems, equipment that has reached the end of its useful life is often replaced at an early stage for efficient operation. In contrast, in industrial plant systems, which have many pieces of industrial equipment, not a few of industrial equipment including end-of-line industrial equipment are in continuous operation for several decades or more. In such cases, monitoring is required so that the constraint condition is met not to affect the legacy industrial equipment. The aforementioned network monitoring software described above cannot handle such constraint conditions specific to industrial plant systems.

An object of the present invention, which has been made to solve the aforementioned problems, is to provide a SCADA web HMI system that can implement system monitoring functions of industrial plants in a non-programmable and graphical manner.

Solution to Problem

The first aspect relates to a SCADA web HMI system.

A SCADA web HMI system includes a drawing creating device, an HMI server device, and an HMI client device, and is connected to industrial equipment that constitutes an industrial plant and a line concentrator.

The drawing creating device displays a stencil area where a server part corresponding to the HMI server device, a client part corresponding to the HMI client device, an industrial equipment part corresponding to the industrial equipment, a HUB part corresponding to the line concentrator, and a cable part corresponding to a communication cable are arranged.

The drawing creating device displays a drafting area where a network configuration diagram showing that the server part, the client part, and the industrial equipment part are connected to the HUB part via the cable part can be drawn by dragging-and-dropping and positioning each part arranged in the stencil area.

Based on the network configuration diagram drawn in the drafting area, the drawing creating device generates HMI configuration data associated with vector image information on a system monitoring screen on which parts constituting the network configuration diagram are positioned, IP address information on the parts positioned on the system monitoring screen, and inter-part connection information on the parts positioned on the system monitoring screen.

The HMI server device applies the HMI configuration data to a server runtime library in which monitoring schemes are predetermined for a group of devices including the HMI client device, the industrial equipment, and the line concentrator, thereby executing a system monitoring process for monitoring the communication status of each device of the group.

The HMI server device transmits a display signal according to the communication status of each device of the group monitored by the system monitoring process, to the HMI client device.

The HMI client device runs a web browser.

The web browser draws the system monitoring screen based on the vector image information received from the HMI server device.

The web browser changes the display statuses of the parts positioned on the system monitoring screen according to the received display signal.

The second aspect further has the following features in addition to the first aspect.

The system monitoring process monitors the communication status of each device of the group such that a constraint condition that monitoring frequency for the industrial equipment is lower than monitoring frequency for the HMI client device is met.

The third aspect further has the following features in addition to the first or second aspect.

If the communication status of each device of the group monitored by the system monitoring process is abnormal, the HMI server device executes an alarm management process to transmit an alarm signal to the web browser.

The web browser displays contents of the alarm signal even when the system monitoring screen is not drawn.

The fourth aspect further has the following features in addition to any one of the first to third aspects.

If the communication status of the line concentrator is abnormal and the communication status of the industrial equipment is normal, the system monitoring process estimates that an actual path from the HMI server device to the industrial equipment is different from a path from the server part to the industrial equipment part drawn on the system monitoring screen, and transmits the display signal indicating a wiring anomaly.

Effects of Invention

According to the first aspect, the drawing creating device can generate HMI configuration data for the system monitoring screen from the network configuration diagram drawn by drag-and-drop operation. The HMI server device can execute the system monitoring process by applying HMI configuration data to a predetermined server runtime library, and transmit a display signal according to the communication status of a monitored device. The HMI client device can draw the system monitoring screen on the web browser and change the display statuses of the parts positioned on the system monitoring screen according to the received display signal. Thus, according to the present invention, the system monitoring function of an industrial plant can be implemented in a non-programmable graphical manner.

According to the second aspect, system monitoring can be executed such that constraint conditions are met in existing industrial plants that include legacy industrial equipment. Thus, side effects that interfere with the operation of existing industrial plants can be prevented.

According to the third aspect, alarm signals can be notified to users even if the system monitoring screen is not drawn on the web browser.

According to the fourth aspect, when there is a discrepancy between the communication status of the line concentrator estimated from the network topology and the directly detected communication status of the line concentrator, the user can be notified that the actual network configuration is different from the configuration in the network configuration diagram on the system monitoring screen.

BRIEF DESCRIPTION OF DRAWINGS

FIG. 3 is a diagram showing an example of IP address information, inter-part connection information, and client notification information according to First Embodiment of the present invention;

FIG. 15 shows an example of monitoring schemes, display schemes and constraint conditions of parts.

DESCRIPTION OF EMBODIMENTS

Figure 1:
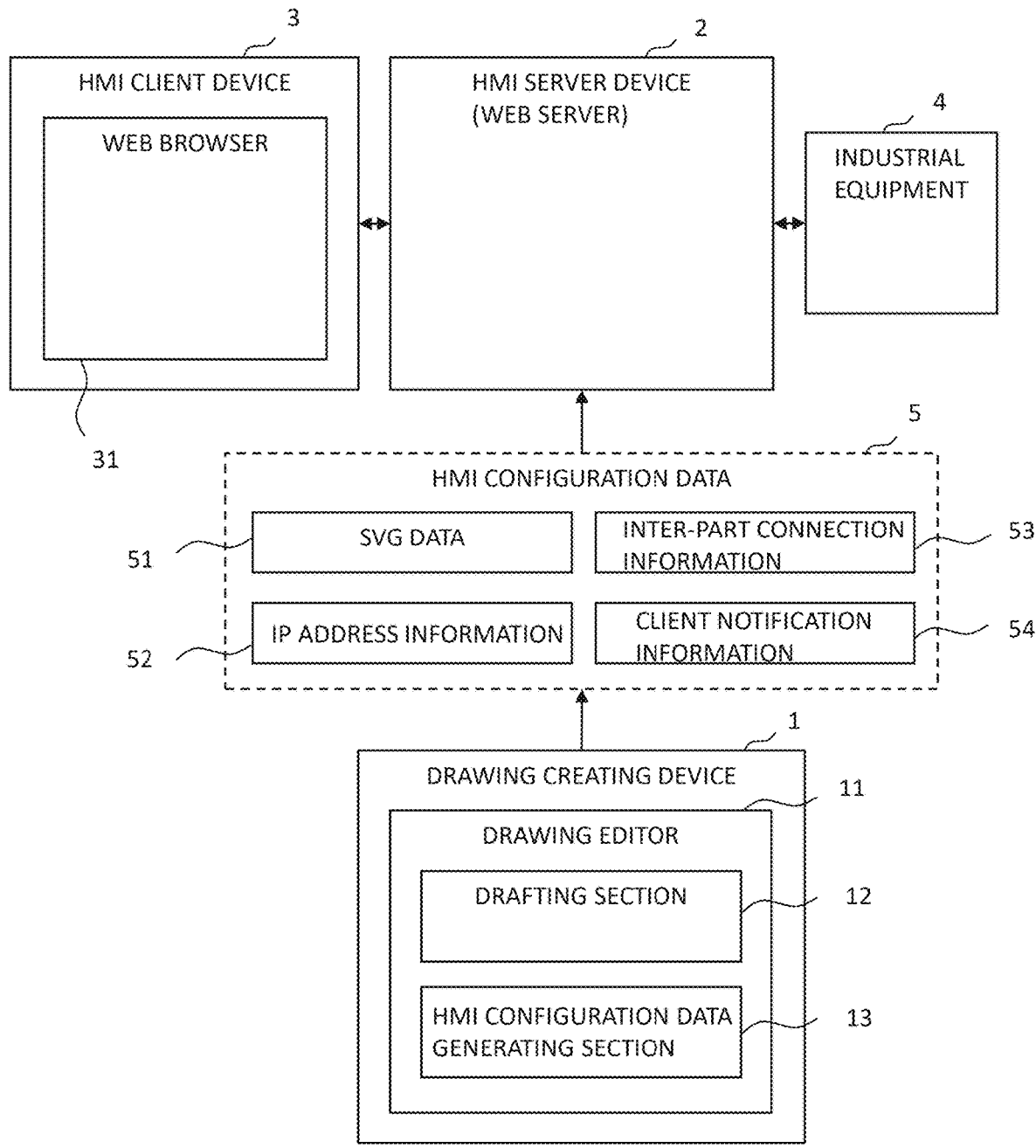
FIG. 1 is a diagram for explaining an example configuration of a SCADA web HMI system according to First Embodiment of the present invention.

An embodiment of the present invention will be described in detail with reference to the drawings. Components common to the drawings are denoted by the same reference numeral, and duplicate explanations will be omitted.

First Embodiment 1-1. SCADA Web HMI System

FIG. 1 is a diagram for explaining an example configuration of a SCADA web HMI system. The SCADA web HMI system is an HMI subsystem that constitutes a part of SCADA which monitors and controls an industrial plant. The SCADA web HMI system shown in FIG. 1 includes a drawing creating device 1, HMI server device 2, and HMI client device 3. The HMI server device 2 and the HMI client device 3 are connected to at least one piece of industrial equipment 4 that constitutes an industrial plant, via a computer network.

The drawing creating device 1 is a development environment which runs a drawing editor 11. The HMI developer uses the drawing editor 11 to design multiple HMI screens for monitoring and controlling the industrial plant. The drawing creating device 1 generates HMI configuration data 5 containing vector image information on each HMI screen based on each HMI screen image drawn using the drawing editor 11.

The HMI server device 2 and the HMI client device 3 are execution environments, which read the HMI configuration data 5 and function as browser-based HMI subsystems. The web browser 31 running on the HMI client device 3 operates in cooperation with the web server running on the HMI server device 2. The Each HMI screen drawn on the web browser 31 functions as a screen for monitoring and controlling the industrial plant.

The industrial equipment 4 is, for example, a PLC, PC, gateway, or the like connected to the sensors and actuators that constitute the industrial plant.

1-2. Drawing Creating Device

The drawing editor 11 that the HMI developer uses is referred to as an engineering tool. The drawing editor 11 executed by the drawing creating device 1 has an advanced drawing editing function and the function of saving drawing data in SVG format. The available base functions of the drawing editor 11 include, for example, Microsoft Visio (registered trademark). Furthermore, the drawing editor 11 includes a drafting section 12 and an HMI configuration data generating section 13.

Figure 2:
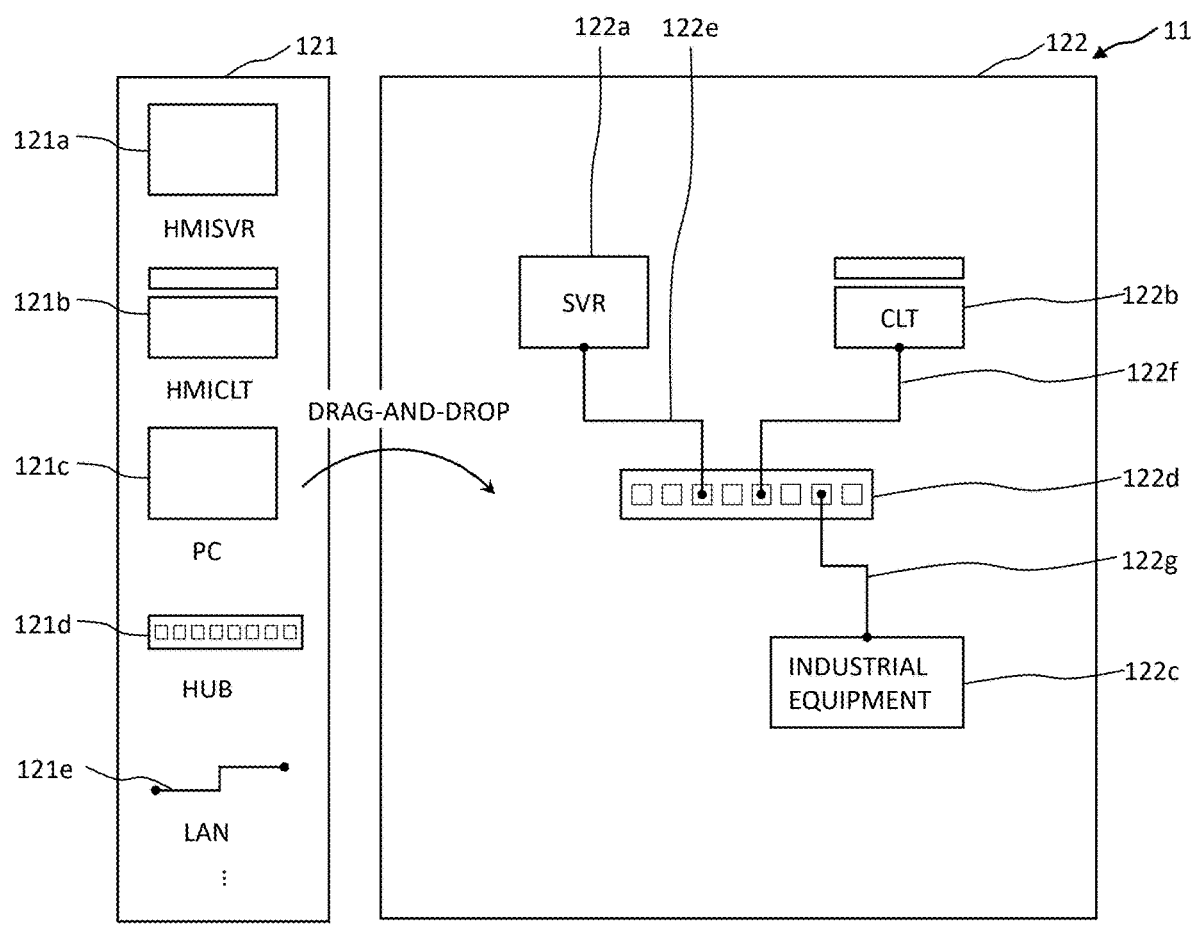
FIG. 2 is an example of a drawing creation screen displayed by a drawing editor according to First Embodiment of the present invention.

Referring to FIG. 2, the drawing creation screen displayed by the drafting section 12 will be described. FIG. 2 shows an example of a drawing creation screen that the drawing editor 11 displays.

The drafting section 12 displays, on a monitor 1c (FIG. 13), a stencil area 121 where master shapes of the parts needed to create the drawing are arranged, and a drafting area 122 where drawings are drawn, side by side. The drafting section 12 can also position parts that are in the stencil area 121 selected by the HMI developer, in the drawing in the drafting area 122, using an input/output interface 1d (FIG. 13) such as a mouse.

The following will describe a system monitoring screen for monitoring the network configuration of an industrial plant, as an example of an HMI screen.

Arranged in the stencil area 121 shown in FIG. 2 are the master shape 121a of the server part corresponding to the HMI server device 2, the master shape 121b of the client part corresponding to the HMI client device 3, the master shape 121c of the industrial equipment part corresponding to the industrial equipment 4, the master shape 121d of the HUB part corresponding to a line concentrator 6 (FIG. 4), and the master shape 121e of the cable part corresponding to the communication cable. The HMI developer can copy parts on the stencil area 121 and position them in any positions in the drafting area 122 by a drag-and-drop operation using mouse operation.

What is drawn in the drafting area 122 shown in FIG. 2 is an example of a network configuration diagram (network topology) used as a system monitoring screen. What is drawn in the drafting area 122 shown in FIG. 2 is a network configuration diagram where the server part 122a, client part 122b, and industrial equipment part 122c are connected to the HUB part 122d via the cable parts 122e, 122f, and 122g, respectively. The network configuration diagram is drawn by dragging and dropping each of the parts arranged in the stencil area 121 onto the drafting area 122.

Figure 14:
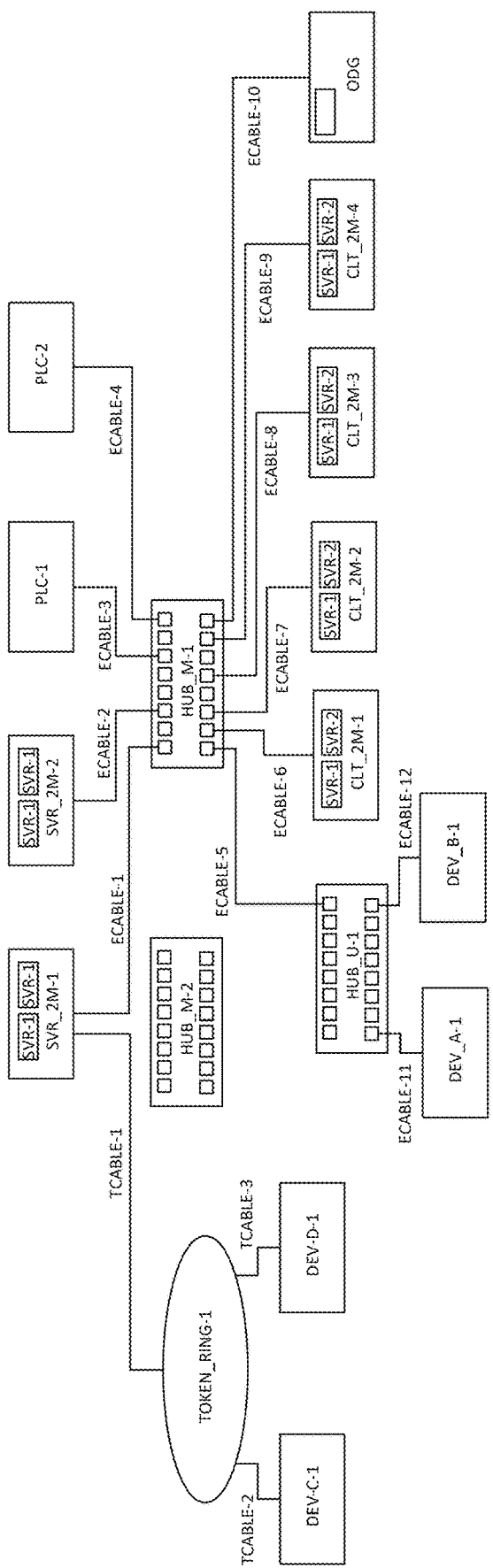
FIG. 14 shows an example of a network configuration diagram created by a drawing editor.

In addition, a complex network configuration diagram such as the one shown in FIG. 14 can be drawn in the drafting area 122. In order to draw such a network configuration diagram, the stencil area 121 has a master shape for each of the part types listed in the part type column shown in FIG. 15.

Explanation will be continued returning to FIG. 1. The HMI configuration data generating section 13 generates HMI configuration data 5 based on the network configuration diagram drawn in the drafting area 122. The HMI configuration data 5 contains scalable vector graphics (SVG) data 51, IP address information 52, inter-part connection information 53, and client notification information 54, which are associated with part names. A part name is a unique name in the system and is a combination of a screen name, part type, and part number.

SVG data 51 is vector image information on the system monitoring screen in which the parts constituting the network configuration diagram are positioned, and includes the part name, location, shape, color, size, and other static presentation attributes of each part. The IP address information 52 determines a correlation between the part name of each part positioned on the system monitoring screen and the IP address of the device corresponding to the part. The HMI developer can edit the IP address as needed. The inter-part connection information 53 determines the connection relationship between the parts positioned on the system monitoring screen. The connection relationship is determined by the combination of the part names of two parts connected through a cable part. Client notification information 54 determines the relationship between the part name and the content of at least one alarm signal. The HMI developer can edit the contents of alarm signals if necessary.

Furthermore, the HMI configuration data generating section 13 outputs the SVG data 51 in the form of a SVG format file, and IP address information 52, inter-part connection information 53, and client notification information 54 in the form of CSV format files. These files are downloaded to the HMI server device 2.

FIG. 3 shows specific examples of IP address information 52, inter-part connection information 53, and client notification information 54 generated by the HMI configuration data generating section 13 based on the network configuration diagram drawn in the drafting area 122 shown in FIG. 2.

In FIG. 3, IP addresses, as examples of IP address information 52, are allocated to the server part 122a (part name: SYS1_1HMISVR), client part 122b (part name: SYS1_2HMICLT), HUB part 122d (part name: SYS1_3HUB8), and industrial equipment part 122c (part name: SYS1_4PC). Note that the part name (SYS1_1HMISVR) is a combination of a screen name (SYS1), part number (1), and part type (HMISVR).

In FIG. 3, as an example of inter-part connection information 53, a connection relationship between two parts connected through a cable part based on a combination of a part name in the column "DeviceEnd" and a part name in the column "ConnectivityEnd" is determined.

In FIG. 3, as an example of client notification information 54, multiple anomaly messages are determined for each part name as there can be multiple abnormal conditions for each device.

1-3. HMI Server Device

Figure 4:
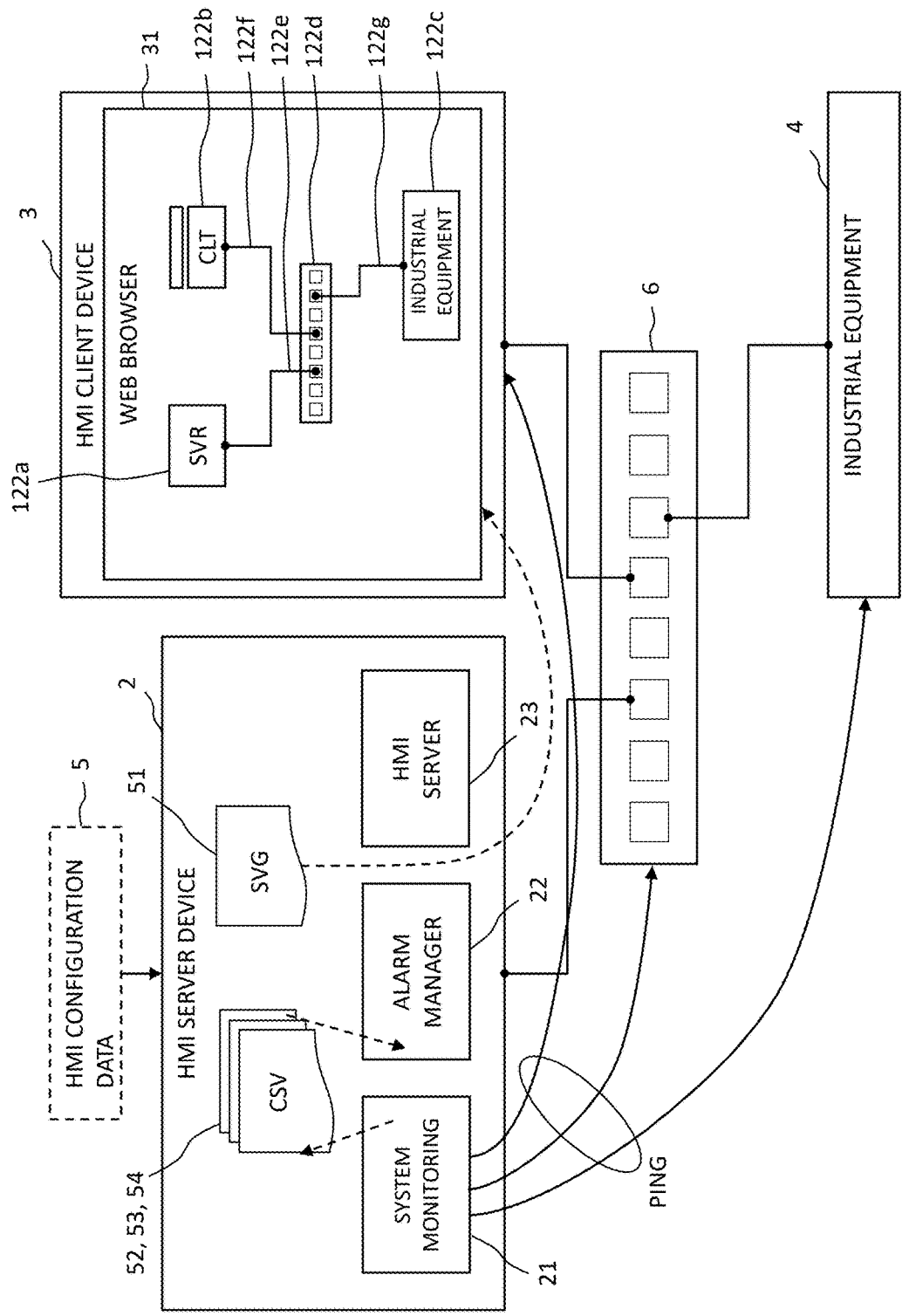
FIG. 4 is a block diagram illustrating an overview of the functions of an HMI server device according to First Embodiment of the present invention.

FIG. 4 is a block diagram illustrating an overview of the functions of the HMI server device 2 according to First Embodiment.

The HMI server device 2 includes a processor 2a (FIG. 13) that executes various processes, and a memory 2b (FIG. 13) in which various information is stored. When the processor 2a executes the program stored in the memory 2b, the processor 2a functions as system monitoring process 21, alarm management process 22, and HMI server process 23. The system monitoring process 21, alarm management process 22, and HMI server process 23 can exchange data with each other by inter-process communication.

In the memory 2b, HMI configuration data 5 downloaded from the drawing creating device 1 is stored. The HMI configuration data 5 contains the aforementioned SVG data 51, IP address information 52, inter-part connection information 53, and client notification information 54. In addition, in the memory 2b, the server runtime library using HMI configuration data 5 applied to it and operating on the HMI server device 2, and the part runtime library receiving display signals or alarm signals and operating on the HMI client device 3 are pre-stored.

(System Monitoring Process)

The system monitoring process 21 monitors the communication status of each group of devices by applying the HMI configuration data 5 to the server runtime library for which the scheme for monitoring each device of the group including an HMI client device 3, an industrial equipment 4, and a line concentrator 6. Here, the HMI configuration data 5 to which the server server runtime library is applied includes IP address information 52, inter-part connection information 53, and client notification information 54.

For the server runtime library, a monitoring scheme is predetermined for each group of devices. For example, for devices with IP addresses, a monitoring scheme that monitors the communication status by checking the response of ICMP packets is determined. For devices that support SNMP, a monitoring scheme that monitors the communication status based on a SNMP protocol is determined. For devices that do not have an IP address or do not support SNMP, a monitoring scheme that estimates the communication status of the device from the results of monitoring of other devices on the path is determined. For devices in a token-ring network, a monitoring scheme that monitors the communication status by obtaining tokens is determined. For main devices such as PLCs and thin clients, a unique monitoring scheme is determined. In addition, for the server runtime library and part runtime library, display schemes determining the display colors of the parts according to the communication status of each device of the group are predetermined.

The following will explain a specific example of a scheme for monitoring a group of devices. For example, a scheme for monitoring the HMI client device 3, industrial equipment 4, and line concentrator 6 shown in FIG. 4 is alive monitoring. To be specific, the system monitoring process 21 transmits an internet control message protocol (ICMP) "echo request" packet to the monitored device (destination device) using the ping command based on IP address information 52. The system monitoring process 21 monitors whether or not an "echo reply" is returned from the destination device, thereby determining whether the communication status of the destination device is normal or abnormal. The system monitoring process 21 transmits a display signal for a part corresponding to the monitored device to the alarm management process 22 and HMI server process 23 according to the communication status (normal or abnormal) of the monitored device. The display signal includes a part name and status value.

Note that the system monitoring process 21 monitors a communication cable that does not have an IP address as follows. If the communication statuses of both of devices connected to both ends of the communication cable are normal, the system monitoring process 21 estimates that the communication status of the communication cable is normal. If the communication status of at least one of the devices connected to both ends of the communication cable is abnormal, the system monitoring process 21 estimates that the communication status of the communication cable is abnormal. The system monitoring process 21 transmits a display signal according to the estimated communication status (normal or abnormal) of the communication cable to the alarm management process 22 and the HMI server process 23.

Figure 5:
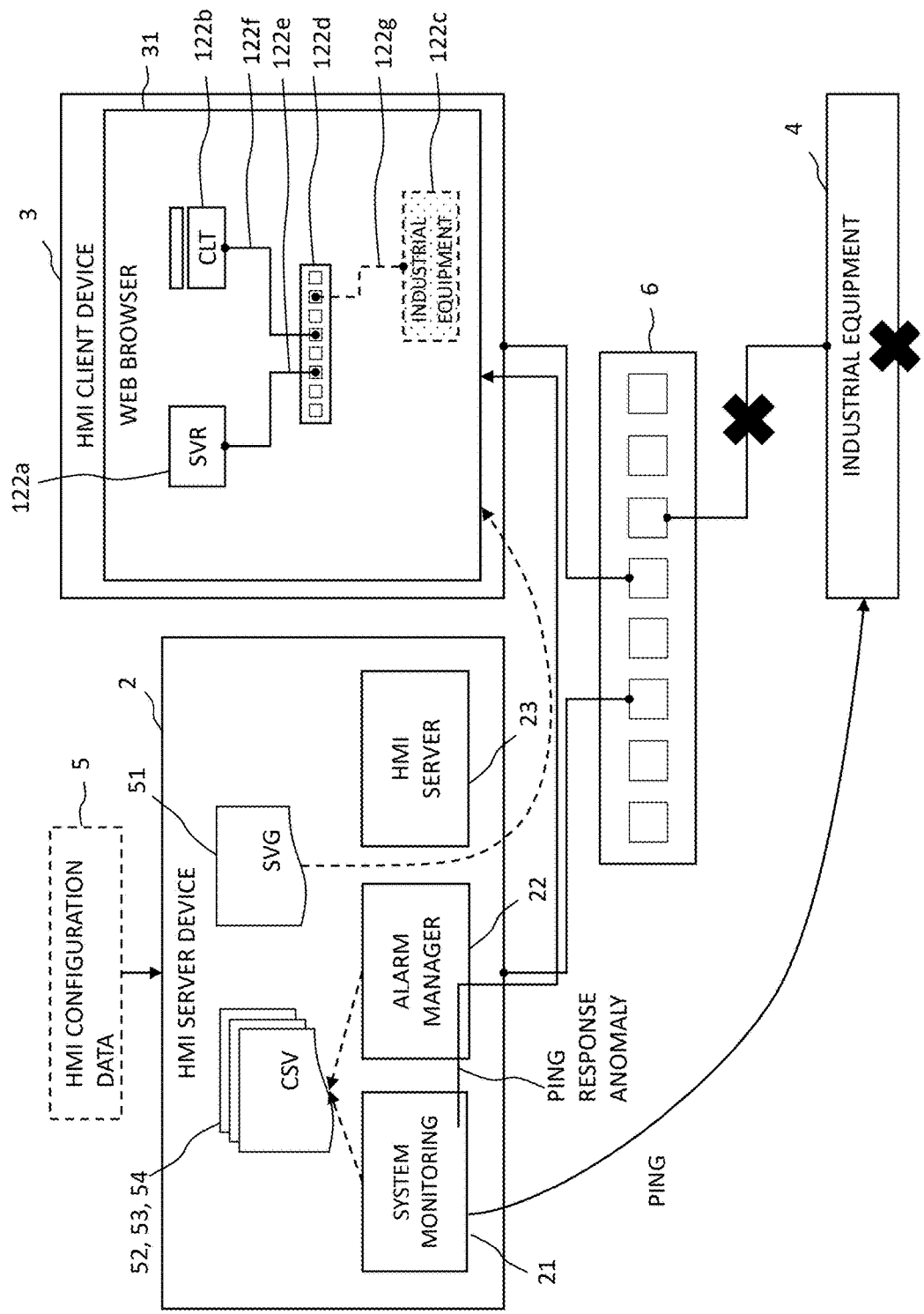
FIG. 5 is a diagram for explaining an example of a system monitoring process according to First Embodiment of the present invention.

FIG. 5 shows an example of a case where there is no response from the industrial equipment 4 and there are responses from the HMI client device 3 and line concentrator 6. In this case, a display signal for displaying the industrial equipment part 122c corresponding to the industrial equipment 4 and the cable part 122g in the color of anomaly (red) is transmitted. In addition, a display signal for displaying the server part 122a corresponding to the HMI server device 2, the client part 122b corresponding to the HMI client device, the HUB part 122d corresponding to the line concentrator 6, and the cable parts (122e, 122f, and 122g) in the color of normality (green) is transmitted.

(System Monitoring Process: Constraint Condition)

By the way, some industrial equipment 4 that constitutes industrial plants is legacy equipment. Some legacy equipment has slow communication processing, and in such cases, communication for network monitoring may interfere with the original operation. For example, in monitoring of equipment by responding to an ICMP echo request packet, if the equipment is not present in the network, ARP packets are repeatedly sent out to detect the MAC address of the equipment. The ARP packets are transmitted by broadcasting. Therefore, if equipment with slow communication processing receives and processes a large number of ARP packets, the original function of the equipment may malfunction. To avoid such a situation, it is necessary to set restrictions on the monitoring scheme.

Therefore, the system monitoring process 21 monitors the communication status of each group of devices such that the constraint condition that the monitoring frequency for the legacy industrial equipment 4 is lower than that for the HMI client device 3 and the line concentrator 6 is met. As an example of the constraint condition, if there is industrial equipment 4 that is not capable of communication processing at high speed, the ICMP echo request packet sending interval can be increased, and if no industrial equipment 4 is found, the ICMP echo request packet sending interval can be increased in steps. When such a constraint condition is met, side effects can be prevented when another system monitoring function is applied to an existing industrial system.

(System Monitoring Process: Estimation of Communication Status of Unmanaged Equipment)

Next, the following will explain an estimation method adopted when the communication status of the monitored device cannot be directly monitored. If the line concentrator 6 is a managed equipment, it has an IP address and the communication status of the line concentrator 6 can be directly monitored, whereas if the line concentrator 6 is unmanaged equipment, it does not have an IP address and the communication status needs to be indirectly monitored.

For this reason, the system monitoring process 21 is configured to obtain the path from the HMI server device 2 to each of the devices (HMI client device 3 and industrial equipment 4) from the inter-part connection information 53 and estimate the communication status of the device on the path (line concentrator 6) as follows.

(1) If the communication status of at least one device in the group of devices connected to the line concentrator 6 is normal, the system monitoring process 21 estimates that the communication status of the line concentrator 6 is normal.

(2) If the communication statuses of all devices connected to the line concentrator 6 are normal, the system monitoring process 21 estimates that the communication status of the line concentrator 6 is abnormal.

Figure 6:
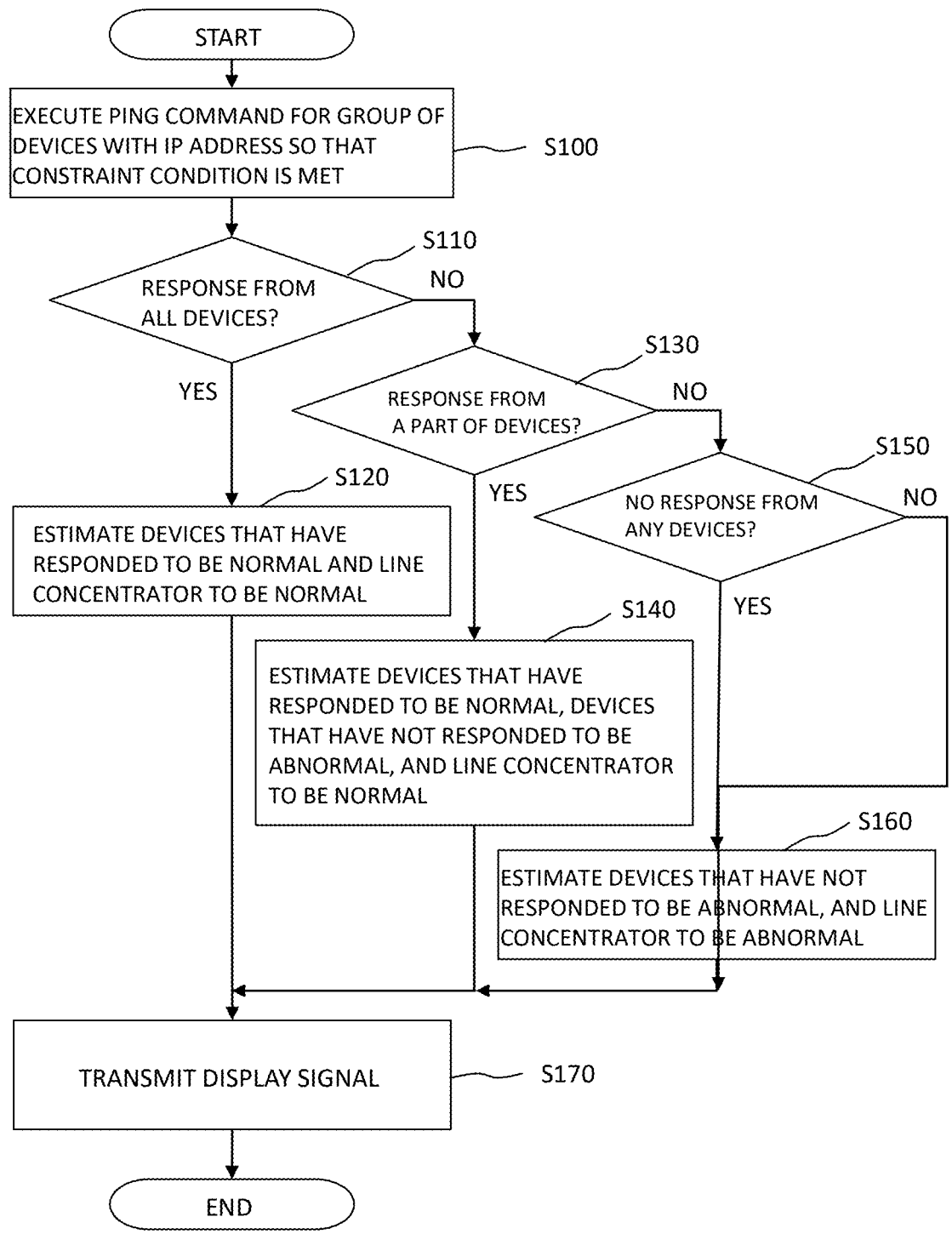
FIG. 6 is a flowchart for explaining the system monitoring process according to First Embodiment of the present invention.

The following will explain specific examples of the system monitoring process 21 described above with reference to FIGS. 6 to 9. FIG. 6 is a flowchart for explaining a process for monitoring the communication status of the group of devices, in the system monitoring process 21 according to First Embodiment. This explanation will be based on the assumption that the line concentrator 6 is an unmanaged device (unmanaged HUB) that does not have an IP address, in the network configuration shown in FIG. 4.

In Step S100, the system monitoring process 21 executes the ping command with the group of devices that have an IP address (the HMI client device 3 and industrial equipment 4) as a destination device such that the constraint condition is met.

In Step S110, whether ICMP echo response messages have been received from all destination devices is determined. If ICMP echo response messages have been received from all destination devices, the process of Step S120 is executed.

In Step S120, the communication statuses of all destination devices are determined to be normal. In addition, since the communication status of at least one destination device in the group of devices connected to the line concentrator 6 is normal, the line concentrator 6, which is an unmanaged device, is estimated to be normal.

Figure 7:
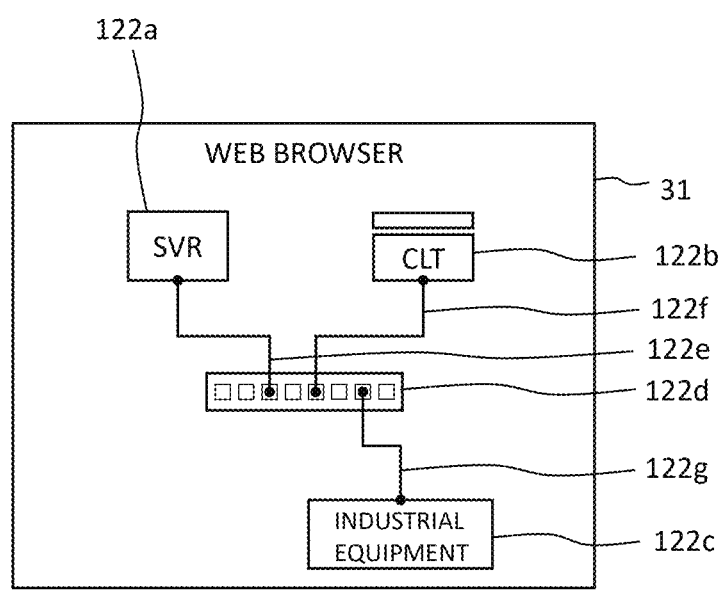
FIG. 7 is a diagram for explaining an example of the system monitoring process according to First Embodiment of the present invention.

Next, in Step S170, a display signal related to the parts positioned on the system monitoring screen is transmitted. FIG. 7 shows an example of presentation on the system monitoring screen when there are responses from all destination devices (HMI client device 3 and industrial equipment 4). After the process of Step S120, in Step S170, a display signal for displaying the server part 122a corresponding to the HMI server device 2, the client part 122b corresponding to the HMI client device 3, the industrial equipment part 122c corresponding to the industrial equipment 4, the HUB part 122d corresponding to the line concentrator 6, and the cable parts (122e, 122f, and 122g) in the color of normality (green) is transmitted.

If the determination condition of Step S110 is not met, the process of Step S130 is executed. In Step S130, whether or not an ICMP echo response message has been received from a part of the destination devices is determined. If an ICMP echo response message has been received from a part of the destination devices, the process of Step S140 is executed.

In Step S140, the communication status of the destination device that has responded is determined to be normal. The communication status of the destination device that has not responded is determined to be abnormal. In addition, since the communication status of at least one destination device in the group of devices connected to the line concentrator 6 is normal, the line concentrator 6, which is unmanaged equipment, is estimated to be normal.

Figure 8:
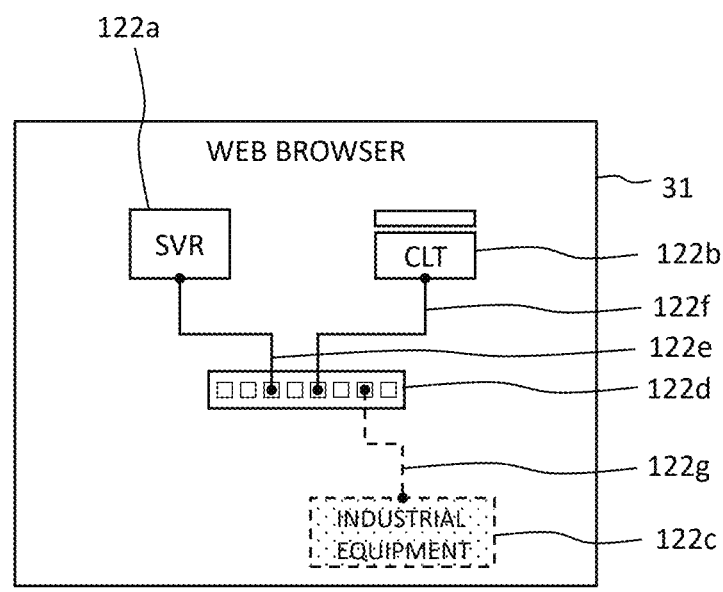
FIG. 8 is a diagram for explaining an example of the system monitoring process according to First Embodiment of the present invention.

Next, in Step S170, a display signal related to the parts positioned on the system monitoring screen is transmitted. FIG. 8 is a diagram showing an example of presentation on the system monitoring screen when there is a response from a part of the destination devices (HMI client device 3). After the process of Step S140, in Step S170, a display signal for displaying the server part 122a corresponding to the HMI server device 2, the client part 122b corresponding to the HMI client device 3, and the cable parts (122e and 122f) connected to these in the color of normality (green) is transmitted. Furthermore, a display signal for displaying the industrial equipment part 122c corresponding to the industrial equipment 4 and the cable part 122g connected to it in the color of anomaly (red) is transmitted. In addition, a display signal for displaying the HUB part 122d corresponding to the line concentrator 6 in the color of normality (green) is transmitted.

If the determination condition of Step S130 is not met, the process of Step S150 is executed. In Step S150, whether or not an ICMP echo response message has not been received from all destination devices is determined. If an ICMP echo response messages has not been received from all destination devices, the process of Step S160 is executed.

In Step S160, the communication statuses of all destination devices are determined to be abnormal. In addition, since the communication status of all the destination devices connected to the line concentrator 6 are abnormal, the line concentrator 6, which is unmanaged equipment, is estimated to be abnormal.

Figure 9:
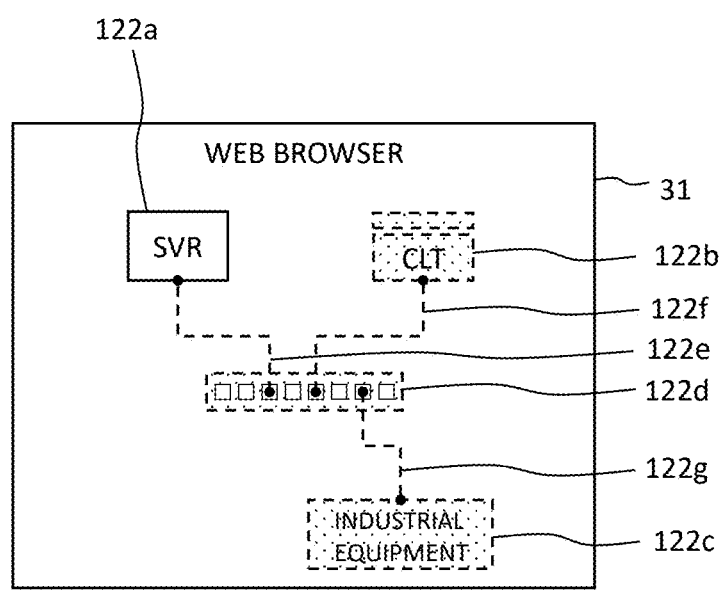
FIG. 9 is a diagram for explaining an example of the system monitoring process according to First Embodiment of the present invention.

Next, in Step S170, a display signal related to the parts positioned on the system monitoring screen is transmitted. FIG. 9 is a diagram showing an example of presentation on the system monitoring screen when not all the destination devices (HMI client device 3 and industrial equipment 4)

have responded. After the process of Step S160, in Step S170, a display signal for displaying the server part 122a corresponding to the HMI server device 2 in the color of normality (green) is transmitted. A display signal for displaying the client part 122b corresponding to the HMI client device 3, the industrial equipment part 122c corresponding to the industrial equipment 4, the HUB part 122d corresponding to the line concentrator 6, and the cable parts (122e, 122f, and 122g) in the color of anomaly (red) is transmitted.

This embodiment has described an example case where the ping command is used as a scheme for monitoring communication statuses, which is not necessarily the case. As shown in FIG. 15, various monitoring schemes exist for each of the devices constituting an industrial plant, and these monitoring methods are predetermined in the server runtime library stored in the memory 2b.

(Alarm Management Process)

Returning to FIG. 4, alarm management process 22 will be explained. The alarm management process 22 determines, based on the display signals received from the system monitoring process 21, whether or not the communication status of each device of the group monitored by the system monitoring process 21 is abnormal. If the communication status of each device of the group monitored by the system monitoring process 21 is abnormal, the alarm management process 22 transmits an alarm signal to the web browser 31 through the HMI server process 23. The contents of the alarm signal must be notified to the operator. Therefore, the alarm signal is not dependent on the HMI screen being drawn by the web browser 31, i.e., is notified to the web browser 31 even if the system monitoring screen is not being drawn.

(HMI Server Process)

Next, the HMI server process 23 shown in FIG. 4 will be described. The HMI server process 23 includes a web server function that communicates with the web browser 31 run on the HMI client device 3. The HMI server process 23 transmits contents in response to a request from the web browser 31. The contents include HTML files (not shown in the drawing), HMI screen-specific SVG data 51, and a part runtime library that describes operations of part types.

The part runtime library contains a set of scripts that describe operation for each part type. The scripts are JavaScript (registered trademark) programs defined for each part type. The scripts can be executed on each web browser 31 with parameters (e.g., part name and state value contained in the display signal) given as necessary.

The HMI server process 23 transmits the part-by-part display signals received from the system monitoring process 21, the part-by-part alarm signals received from the alarm management process 22, and the signals received from the industrial equipment 4 to the web browser 31. The display signals related to a system monitoring screen need only be transmitted when the screen is displayed on the web browser 31. On the other hand, alarm signals are transmitted independently of the HMI screen displayed on the web browser 31.

1-4. HMI Client Device

Figure 13:
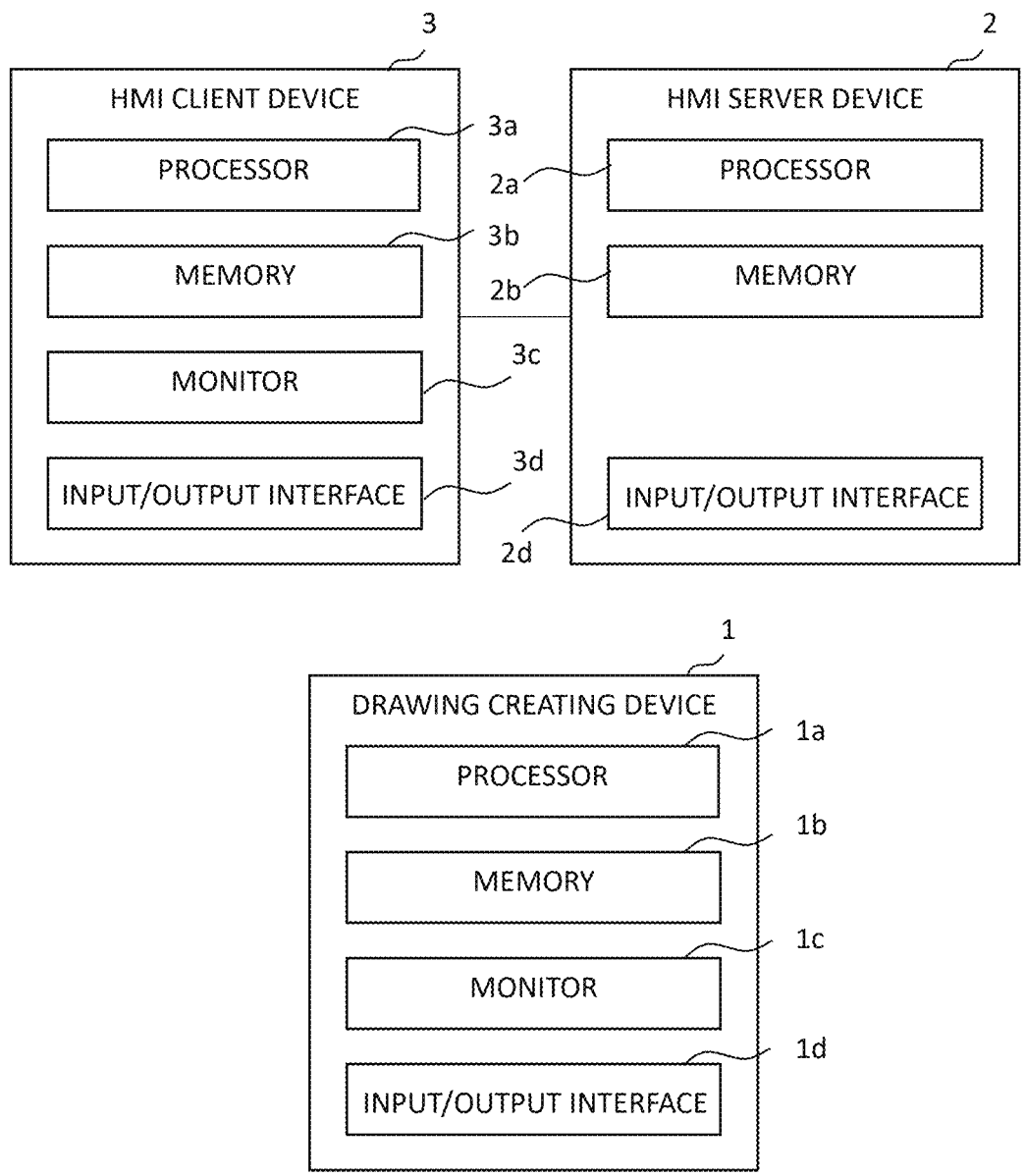
FIG. 13 is a block diagram showing an example hardware configuration of a drawing creating device, HMI server device, and HMI client device.

Next, the HMI Client device 3 shown in FIG. 4 will be described. The HMI Client device 3 includes a processor 3a (FIG. 13) that executes various processes, a memory 3b (FIG. 13) in which various information is stored, and a monitor 3c (FIG. 13). The processor 3a is configured to run, when the processor 3a executes the program stored in the memory 3b, the web browser 31 that displays an HMI screen on which display parts are positioned. The monitor 3c displays the web browser 31.

The web browser 31 can obtain contents related to HMI screens from the HMI server process 23 of the HMI server device 2. The contents include, as described above, HTML files, SVG data 51 for each HMI screen, and a part runtime library which is a set of scripts that describe the operation of each part type.

The web browser 31 draws a system monitoring screen based on the SVG data 51 received from the HMI server device 2. The web browser 31 changes the display status of the parts positioned on the system monitoring screen according to the received display signal. To be specific, when the part name and status value contained in the display signal are applied to the script for the part type of that part contained in the part runtime library, a process for changing the color (e.g., green or red) of the part according to the status value (e.g., normal or abnormal) of the display signal is executed. For instance, upon reception of a display signal (containing a part name and a status value indicating anomaly) related to the industrial equipment part 122c corresponding to the industrial equipment 4 shown in FIG. 5, the web browser 31 applies the display signal to the script for the industrial equipment part included in the part runtime library and changes the display status of the industrial equipment part 122c to the color of anomaly (red).

The web browser 31 also displays the contents of the alarm signal even if the system monitoring screen is not drawn. To be specific, the part name and message content contained in the received alarm signal are applied to the script according to the part type of that part contained in the part runtime library, a process for changing the color of the alarm part and displaying the message content according to the alarm signal is executed.

1-5. Effects

As explained above, the drawing creating device 1 can generate HMI configuration data 5 for the system monitoring screen, from the network configuration diagram drawn by drag-and-drop mouse operation. The HMI server device 2 can execute the system monitoring process 21 by applying the HMI configuration data 5 to a predetermined server runtime library, and transmit a display signal according to the communication status of the monitored device. The HMI client device 3 can draw a system monitoring screen on the web browser 31 and, in accordance with the received display signal, change the display status of parts positioned on the system monitoring screen. Consequently, the system according to this embodiment can implement the system monitoring function of the industrial plant in a non-programmable graphical manner.

In addition, the system according to this embodiment can execute system monitoring such that constraint conditions are met in existing industrial plants that include legacy industrial equipment. Thus, side effects that interfere with the operation of existing industrial plants can be prevented. In addition, alarm signals can be notified to users even if the system monitoring screen is not drawn on the web browser.

Second Embodiment 2-1. Summary of Second Embodiment

Next, Second Embodiment of the present invention will be described with reference to FIGS. 10 to 12. In the configuration shown in FIGS. 1 and 10, the system of this embodiment can be implemented when the system monitoring process 21 executes the routine shown in FIG. 11 which will be explained below.

First Embodiment above has been described on the assumption that the actual network configuration and the network configuration on the system monitoring screen are the same. By the way, in some cases, the network configuration in operation and the network configuration on the system monitoring screen can be different due to human error, such as a miswiring of communication cables. It is desirable that such a state be detected and notified to the user.

For this reason, the system of this embodiment is configured to notify the user when detecting a difference between the network configuration in operation and the network configuration on the system monitoring screen.

(System Monitoring Process)

Figure 10:
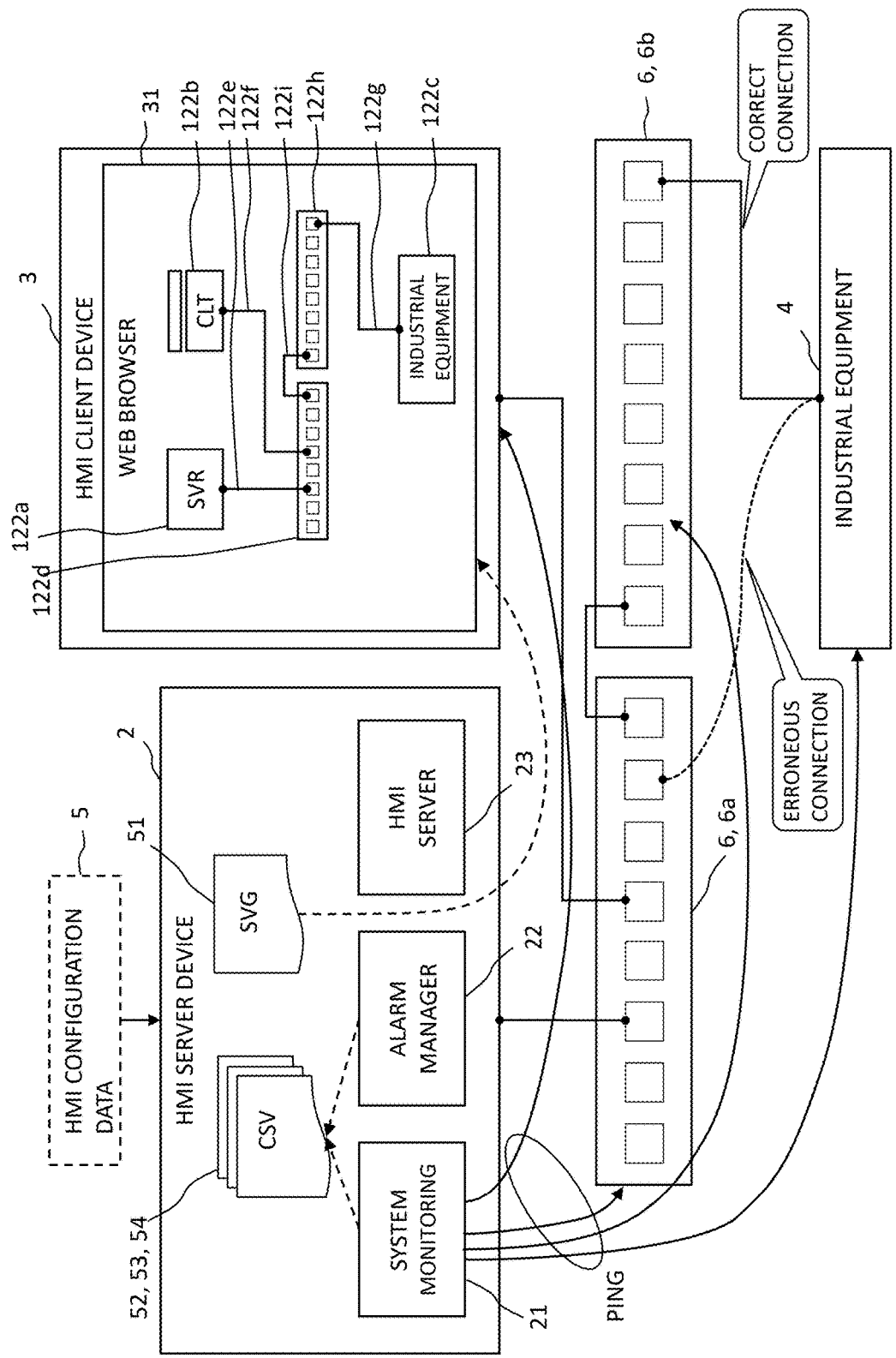
FIG. 10 is a block diagram illustrating an overview of the functions of the HMI server device according to Second Embodiment of the present invention.

FIG. 10 is a diagram for explaining an example of a network configuration according to Second Embodiment. This network configuration has two line concentrators 6. The first line concentrator 6a and the second line concentrator 6b are management equipment with IP addresses. The first line concentrator 6a is connected to the HMI server device 2, HMI client device 3, and second line concentrator 6b. The second line concentrator 6b is connected to the industrial equipment 4.

Suppose here that, due to human error, the industrial equipment 4 supposed to be connected to the second line concentrator 6b is connected to the first line concentrator 6a. If the second line concentrator 6b fails in this connection, the industrial equipment 4 responds to the ping command from the HMI server device 2, but the second line concentrator 6b does not. If there is a response from the industrial equipment 4, the second line concentrator 6b (122h) on the path displayed on the system monitoring screen is estimated to be normal. Nevertheless, since there is no response from the second line concentrator 6b, the actual communication status of the second line concentrator 6b is abnormal. In other words, the estimated communication status differs from the actual communication status, resulting in inconsistent monitoring results. In this case, it is estimated that the actual network configuration differs from the network configuration on the system monitoring screen. In such a case, the user is notified with a display signal indicating a wiring anomaly (yellow) and an alarm signal.

Thus, when the communication status of the line concentrator 6 is abnormal and the communication status of the industrial equipment 4 is normal, the system monitoring process 21 according to this embodiment estimates that the actual path from the HMI server device 2 to the industrial equipment 4 is different from the path from the server part 122a to the industrial equipment part 122c drawn on the system monitoring screen, and transmits a display signal indicating a wiring anomaly.

Figure 11:
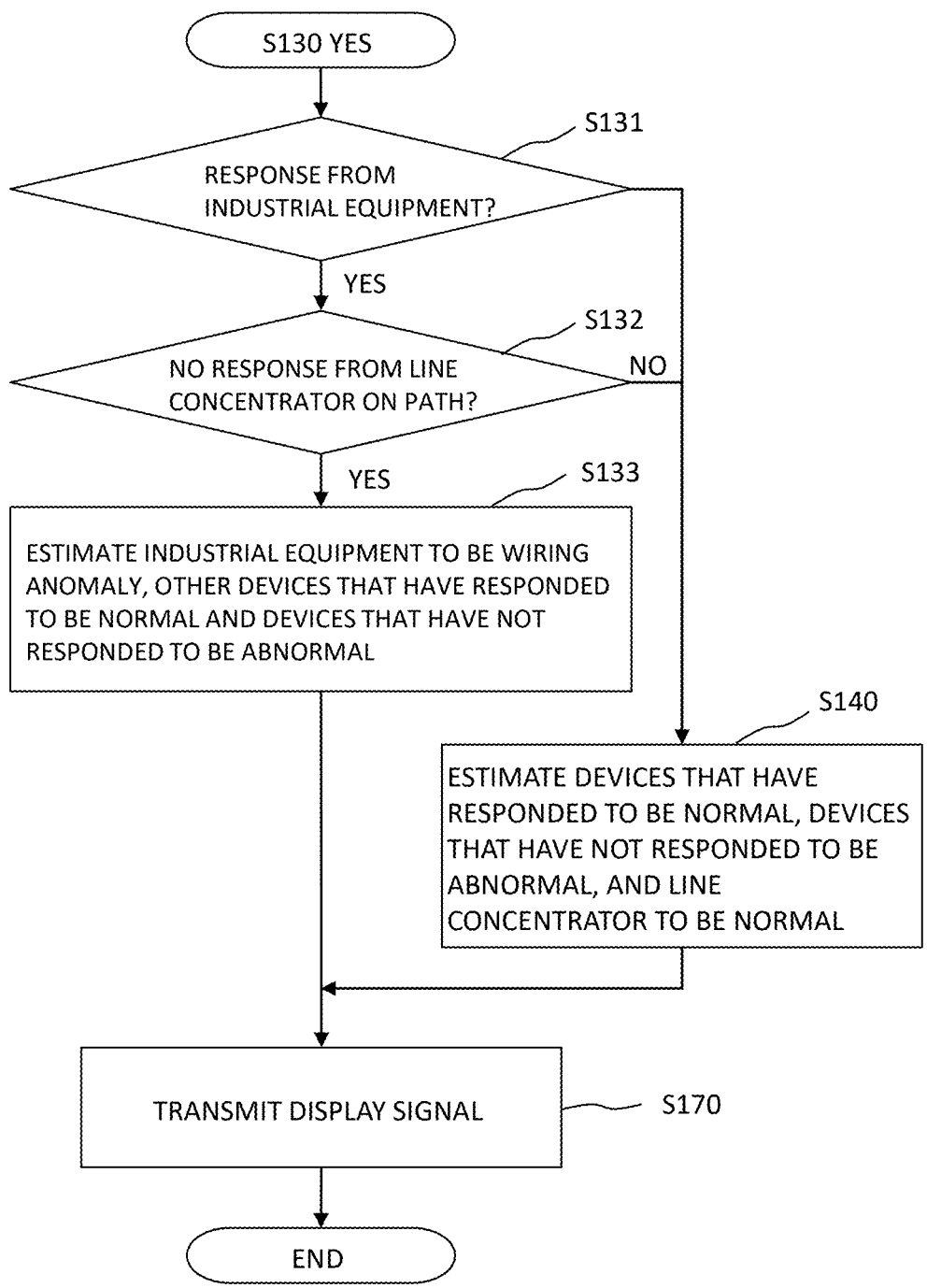
FIG. 11 is a flowchart for explaining a system monitoring process according to Second Embodiment of the present invention.
Figure 12:
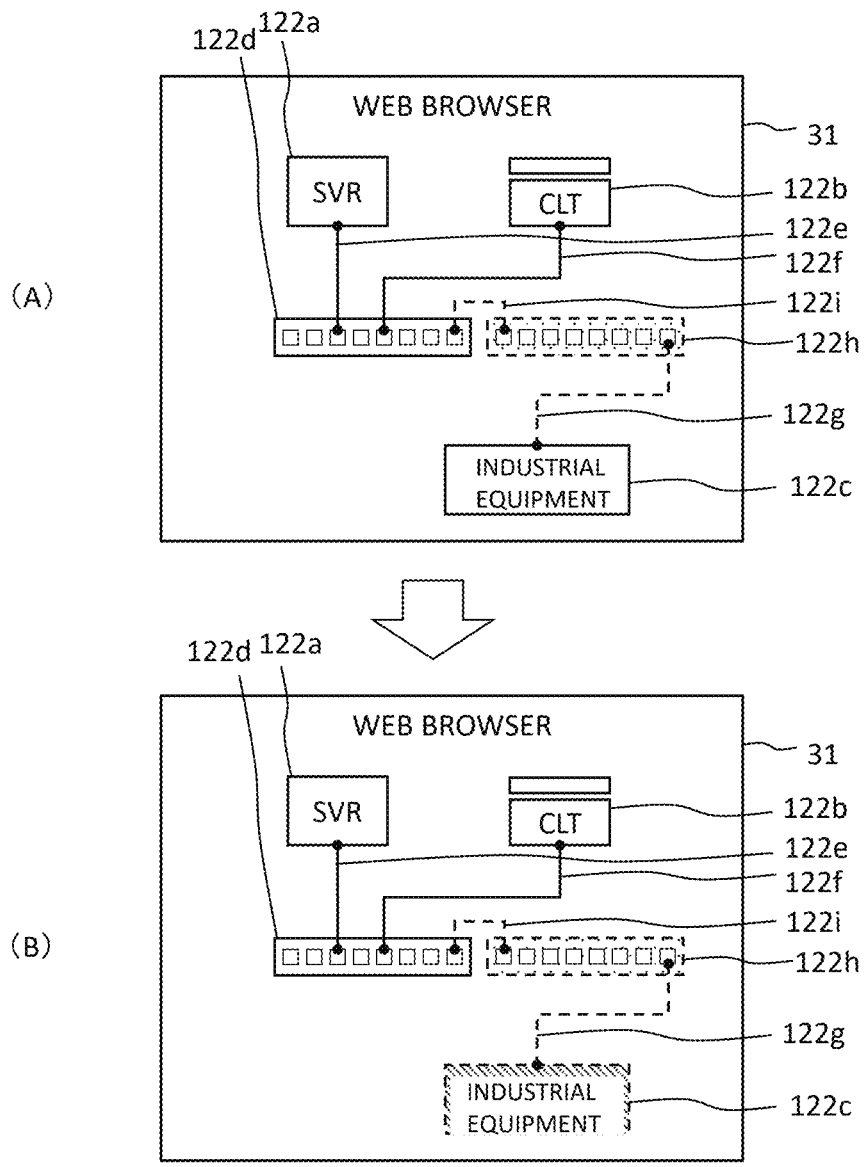
FIG. 12 is a diagram for explaining an example of the system monitoring process according to Second Embodiment of the present invention.

FIG. 11 is a flowchart executed in the system monitoring process 21 according to this embodiment when the determination condition is met in Step S130 described above with reference to FIG. 6.

In Step S131, whether or not an ICMP echo response message has been received from the industrial equipment 4 is determined. If an ICMP echo response message has been received from the industrial equipment 4, further in Step S132, whether or not an ICMP echo response message has not been received from at least one line concentrator 6 on the path from the HMI server device 2 to the industrial equipment 4 is determined.

In Step S132, for example, if no ICMP echo response message has been received from the second line concentrator 6b shown in FIG. 10, the process of Step S133 is executed. In Step S133, the industrial equipment 4 is estimated to have a wiring anomaly. The communication statuses of other devices that have responded are determined to be normal. The communication statuses of the devices that have not responded are determined to be abnormal.

Next, in Step S170, a display signal related to the parts positioned on the system monitoring screen is transmitted. FIG. 12 is a diagram showing an example of presentation on the system monitoring screen when the second line concentrator 6b has not responded. With the system according to First Embodiment, as shown in (A), the industrial equipment part 122c is displayed in the color of normality (green), and the HUB part 122h corresponding to the second line concentrator 6b is displayed in the color of anomaly (red). In contrast, as shown in (B), the system according to this embodiment detects the possibility that the line concentrator 6 to which the industrial equipment 4 should be connected is incorrect, and displays the industrial equipment part 122c in a color indicating wiring anomalies (yellow).

If the determination condition of Step S131 or S132 is not met, the process of Step S140 is executed as in First Embodiment.

Upon reception of a display signal containing the status value indicating a wiring anomaly from the system monitoring process 21, the alarm management process 22 transmits an alarm signal containing a message about the wiring anomaly to the HMI server process 23. The HMI server process 23 transmits the display signal containing the status value of the wiring anomaly from the system monitoring process 21 and the alarm signal to the web browser 31.

2-3. Effects

As explained above, when there is a discrepancy between the communication status of industrial equipment estimated from the network topology and the directly detected communication status of industrial equipment, the system according to this embodiment can notify the user that the actual network configuration is different from the configuration on the system monitoring screen.

3. Example of Hardware Configuration

FIG. 13 is a block diagram showing an example of the hardware configuration of the drawing creating device 1, HMI server device 2, and HMI client device 3.

Each of the aforementioned processes in the drawing creating device 1 is implemented using a processing circuit. The processing circuit consists of a processor 1a, memory 1b, monitor 1c, and input/output interface 1d connected together. The processor 1a implements each process in the drawing creating device 1 by executing various programs stored in the memory 1b. The memory 1b includes a main memory and auxiliary memory. The input/output interface 1d includes, for example, input devices, such as a keyboard, mouse, and touch panel, output devices capable of file output of HMI configuration data 5, and a communication device for transmitting the HMI configuration data 5 to the HMI server device 2.

Each of the aforementioned processes in the HMI server device 2 is implemented using a processing circuit. The processing circuit consists of a processor 2a, memory 2b, and input/output interface 2d connected together. The processor 2a implements each function in the HMI server device 2 by executing various programs stored in the memory 2b. The memory 2b includes a main memory and auxiliary memory. The input/output interface 2d includes a communication device that is connectable to the industrial equipment 4 and HMI client device 3 to transmit and receive data, and a device for obtaining HMI configuration data from the drawing creating device 1.

Each of the aforementioned processes in the HMI client device 3 is implemented using a processing circuit. The processing circuit consists of a processor 3a, memory 3b, monitor 3c, and input/output interface 3d connected together. The processor 3a implements each process in the HMI client device 3 by executing various programs stored in the memory 3b. The memory 3b includes a main memory and auxiliary memory. There may be multiple monitors 3c. The input/output interface 3d includes input devices, such as a keyboard, mouse, and touch panel, and a communication device that is connected to the HMI server device 2 to transmit and receive data.

Although the embodiments of the present invention have been described so far, the present invention should not be limited to the aforementioned embodiments, but can be implemented with various modifications without departing from the scope of the present invention. When the number, quantity, amount, range, and other numeric values related to each type of component are referred to in the aforementioned embodiments, the present invention should not be limited by the numeric values unless specifically stated or clearly specified using such numeric values in principle. Also, the structures and the like described in the aforementioned embodiments are not necessarily essential to the present invention, unless otherwise specifically stated or clearly specified in principle.

REFERENCE SIGNS LIST

1 Drawing creating device
2 HMI server device
3 HMI client device
4 Industrial Equipment
5 HMI configuration data
6 Line concentrator
6a First line concentrator
6b Second line concentrator
11 Drawing editor
12 Drafting section
13 HMI configuration data generating section
21 System monitoring process
22 Alarm management process
23 HMI server process
31 Web browser
51 SVG data
52 IP address information
53 Inter-part connection information
54 Client notification information
121 Stencil area
121a-121e Master shape
122 Drafting area
122a Server part
122b Client part
122c Industrial equipment part
122d, 122h HUB part
122e, 122f, 122g, 122i Cable part

The invention claimed is:

1. A SCADA web HMI system comprising a drawing creating device, an HMI server device, and an HMI client device, the SCADA web HMI system being connected to industrial equipment that constitutes an industrial plant and a line concentrator, wherein:

the drawing creating device is configured to:
display a stencil area where a server part corresponding to the HMI server device, a client part corresponding to the HMI client device, an industrial equipment part corresponding to the industrial equipment, a HUB part corresponding to the line concentrator, and a cable part corresponding to a communication cable are arranged;
display a drafting area where a network configuration diagram showing that the server part, the client part, and the industrial equipment part are connected to the HUB part via the cable part can be drawn by dragging-and-dropping and positioning each part arranged in the stencil area; and
based on the network configuration diagram drawn in the drafting area, generate HMI configuration data associated with vector image information on a system monitoring screen on which parts constituting the network configuration diagram are positioned, IP address information on the parts positioned on the system monitoring screen, and inter-part connection information on the parts positioned on the system monitoring screen,
the HMI server device is configured to:
apply the HMI configuration data to a server runtime library in which monitoring schemes are predetermined for a group of devices including the HMI client device, the industrial equipment, and the line concentrator, thereby executing a system monitoring process for monitoring a communication status of each device of the group; and
transmit a display signal according to the communication status of each device of the group monitored by the system monitoring process, to the HMI client device,
the HMI client device is configured to:
run a web browser,
wherein the web browser is configured to:
draw the system monitoring screen based on the vector image information received from the HMI server device; and
change display statuses of the parts positioned on the system monitoring screen according to the received display signal.

2. The SCADA web HMI system according to claim 1, wherein the system monitoring process monitors the communication status of each device of the group such that a constraint condition that monitoring frequency for the industrial equipment is lower than monitoring frequency for the HMI client device is met.

3. The SCADA web HMI system according to claim 1, wherein:
the HMI server device is configured to execute an alarm management process to transmit an alarm signal to the web browser when the communication status of each device of the group monitored by the system monitoring process is abnormal; and
the web browser is configured to display contents of the alarm signal even when the system monitoring screen is not drawn.

4. The SCADA web HMI system according to claim 1, wherein the system monitoring process estimates that the communication status of the line concentrator is normal when the communication status of at least one device in the group of devices is normal.

5. The SCADA web HMI system according to claim 1, wherein the system monitoring process estimates that the communication status of the line concentrator is abnormal when the communication statuses of all devices connected to the line concentrator are abnormal.

6. The SCADA web HMI system according to claim 1, wherein the system monitoring process estimates that the communication status of the communication cable is normal when the communication statuses of both of devices connected to both ends of the communication cable are normal.

7. The SCADA web HMI system according to claim 1, wherein the system monitoring process estimates that the communication status of the communication cable is abnormal when the communication status of at least one of devices connected to both ends of the communication cable is abnormal.

8. The SCADA web HMI system according to claim 1, wherein the system monitoring process estimates that an actual path from the HMI server device to the industrial equipment is different from a path from the server part to the industrial equipment part drawn on the system monitoring screen, and transmits the display signal indicating a wiring anomaly when the communication status of the line concentrator is abnormal and the communication status of the industrial equipment is normal.

9. The SCADA web HMI system according to claim 2, wherein the system monitoring process estimates that the communication status of the communication cable is abnormal when the communication status of at least one of devices connected to both ends of the communication cable is abnormal.

10. The SCADA web HMI system according to claim 3, wherein the system monitoring process estimates that the communication status of the communication cable is abnormal when the communication status of at least one of devices connected to both ends of the communication cable is abnormal.

11. The SCADA web HMI system according to claim 4, wherein the system monitoring process estimates that the communication status of the communication cable is abnormal when the communication status of at least one of devices connected to both ends of the communication cable is abnormal.

12. The SCADA web HMI system according to claim 5, wherein the system monitoring process estimates that the communication status of the communication cable is abnormal when the communication status of at least one of devices connected to both ends of the communication cable is abnormal.

13. The SCADA web HMI system according to claim 6, wherein the system monitoring process estimates that the communication status of the communication cable is abnormal when the communication status of at least one of devices connected to both ends of the communication cable is abnormal.

14. The SCADA web HMI system according to claim 2, wherein the system monitoring process estimates that an actual path from the HMI server device to the industrial equipment is different from a path from the server part to the industrial equipment part drawn on the system monitoring screen, and transmits the display signal indicating a wiring anomaly when the communication status of the line concentrator is abnormal and the communication status of the industrial equipment is normal.

15. The SCADA web HMI system according to claim 3, wherein the system monitoring process estimates that an actual path from the HMI server device to the industrial equipment is different from a path from the server part to the industrial equipment part drawn on the system monitoring screen, and transmits the display signal indicating a wiring anomaly when the communication status of the line concentrator is abnormal and the communication status of the industrial equipment is normal.

16. The SCADA web HMI system according to claim 4, wherein the system monitoring process estimates that an actual path from the HMI server device to the industrial equipment is different from a path from the server part to the industrial equipment part drawn on the system monitoring screen, and transmits the display signal indicating a wiring anomaly when the communication status of the line concentrator is abnormal and the communication status of the industrial equipment is normal.

17. The SCADA web HMI system according to claim 5, wherein the system monitoring process estimates that an actual path from the HMI server device to the industrial equipment is different from a path from the server part to the industrial equipment part drawn on the system monitoring screen, and transmits the display signal indicating a wiring anomaly when the communication status of the line concentrator is abnormal and the communication status of the industrial equipment is normal.

18. The SCADA web HMI system according to claim 6, wherein the system monitoring process estimates that an actual path from the HMI server device to the industrial equipment is different from a path from the server part to the industrial equipment part drawn on the system monitoring screen, and transmits the display signal indicating a wiring anomaly when the communication status of the line concentrator is abnormal and the communication status of the industrial equipment is normal.

19. The SCADA web HMI system according to claim 7, wherein the system monitoring process estimates that an actual path from the HMI server device to the industrial equipment is different from a path from the server part to the industrial equipment part drawn on the system monitoring screen, and transmits the display signal indicating a wiring anomaly when the communication status of the line concentrator is abnormal and the communication status of the industrial equipment is normal.

* * * * *